United States Patent [19]

La Rocca

[11] Patent Number: 5,565,120
[45] Date of Patent: Oct. 15, 1996

[54] METHOD OF SUPPLYING LASER CUTTING GAS AND CUTTING APPARATUS IMPLEMENTING SUCH A METHOD

[76] Inventor: Aldo V. La Rocca, Viale dei Castagni, 4 - Frazione Revigliasco, 10020 Moncalieri, Italy

[21] Appl. No.: 254,268

[22] Filed: Jun. 6, 1994

Related U.S. Application Data

[63] Continuation-in-part of PCT/IT92/00157 filed on Apr. 12, 1992.

[30] Foreign Application Priority Data

Jun. 12, 1991 [IT] Italy .................. TO91A0949

[51] Int. Cl.$^6$ .................................... B23K 26/08
[52] U.S. Cl. ................. 219/121.72; 219/121.67; 219/121.84
[58] Field of Search ............ 219/121.67, 121.72, 219/121.84

[56] References Cited

U.S. PATENT DOCUMENTS

| | | | |
|---|---|---|---|
| 3,604,890 | 9/1971 | Mullaney et al. | 219/121.67 |
| 3,824,368 | 7/1974 | Locke | 219/121.84 |
| 4,031,351 | 6/1977 | Martin | 219/121.67 |
| 4,084,988 | 4/1978 | Engel et al. | |
| 4,227,582 | 10/1980 | Price | 175/16 |
| 4,319,120 | 3/1982 | Rocca | 219/121.84 |
| 4,891,077 | 1/1990 | Roll et al. | 219/121.67 |

FOREIGN PATENT DOCUMENTS

| | | | |
|---|---|---|---|
| 126547 | 11/1984 | European Pat. Off. | |
| 2352481 | 5/1974 | Germany | |
| 55-70492 | 5/1980 | Japan | 219/121.72 |
| 2-59190 | 2/1990 | Japan | 219/121.72 |

OTHER PUBLICATIONS

Edler, R., et al. "A New Nozzle Configuration For Laser Cutting", Laser und Optoelektronik(23/5) 54–61 (1991).

J. Fieret, M. J. Terry, B. A. Ward "Overview of flow dynamics in gas–assist laser cutting" SPIE vol. 801 High Power Laser (1987).

H. Zefirer, D. Petring and E. Beyer, "Investigation of the gas flow in laser beam cutting" DVS 135 p. 210–214.

R. Edler, P. Berger, H. Hugel, "Performance of various nozzle design in laser cutting" Institut fur Strahlwerkzeuge (ISFW), Universitat Stuttgart Pflaffenwaldring 43, Stuttgart, Federal Republic of Germany.

R. Edler, P. Berger "New Nozzle concept for cutting with High Power Laser" ICALEO'91–Nov. 3–8, 1991, San Jose.

U. Schreiner–Mohr, F. Dausinger, H. Hugel, "New aspects of cutting with $CO_2$ lasers" ICALEO'91–Nov. 3–8, 1991, San Jose, California.

A. Ivarson, J. Powell, L. Ohlsson, C. Magnusson, "Optimization of laser cutting process for thin section stainless steels" ICALEO'91–Nov. 3–8, 1991, San Jose, CA.

*Primary Examiner*—Teresa J. Walberg
*Assistant Examiner*—Gregory L. Mills
*Attorney, Agent, or Firm*—Michael N. Meller

[57] ABSTRACT

A laser cutting apparatus (10) whereby the laser beam (11) is directed on to a cutting portion (13) of the workpiece (15), and a jet (18) of gas is guided, fully enclosed within solid walls, on to the cutting portion (13, 13a) in an inclined direction in relation to the beam (11) and at such a velocity as to control the fluid-thermodynamic effects caused by interaction with the beam (11) and with the material liquefied by the same, and to flush the liquefied material out of the cut (16) in steady, controlled manner. The jet (18) is supplied by means of a solid-walled conduit (21), the end portion of which conveniently presents an opening (37) enabling passage of the beam (11) on to the cutting portion (13, 13a). (FIG. 2)

17 Claims, 2 Drawing Sheets

METHOD OF SUPPLYING LASER CUTTING GAS AND CUTTING APPARATUS IMPLEMENTING SUCH A METHOD

This application is a continuation of PCT/IT92/00157 Apr. 12, 1992 which in turn claims priority from Italian patent Application No. TO91A000949 filed Dec. 6, 1991.

TECHNICAL FIELD

The present invention relates to a method of supplying laser cutting gas, and a cutting apparatus implementing such a method.

BACKGROUND ART

Laser cutting, e.g. of metal plate, is usually performed with the aid of a jet of gas directed onto the cutting area for flushing out the liquified material.

The type of gas used depends on the workpiece material, and must be so selected as to prevent undesired chemical reactions affecting the cutting faces. It is particularly important to prevent the formation of products affecting the metallurgical structure of the cutting faces, and so resulting in hardness or fragility preventing post-process machining or actual use of the part, if no further machining is required.

Oxygen is excellent for cutting ferrous materials (alloys), due to the exothermic reaction produced at high temperatures (over 720° C.). If properly employed, the energy and fluid-thermodynamic effects so produced may result in increased cutting speed for a given power of the laser, improved flushout of the liquefied material, and a better surface finish of the cutting faces.

To understand the chain of events occurring in this process, some knowledge is required of the fluid-thermodynamics of reactive gases, and the complex phenomena produced when such a gas is subjected to intense heat by both the laser beam and the liquified material, and the mass of the gas stream is increased by the presence of the liquid. This results in a gas stream consisting of a mixture of compressible gas and (incompressible) liquid, with all the possibilities this entails. For example, the liquid may be broken down into large or small drops, or even atomized.

Depending on the amount of heat, particularly that radiated by the laser beam and high-temperature solid or fluid surfaces, and the combined thermal and fluid-dynamic effects involved, the drops and atomized liquid particles may be converted into steam, which, though undesirable, is nevertheless inevitable. Moreover, due to their small size and the absence of a cooling mass (the cold faces of the workpiece), the liquid particles within range of the laser beam may also be converted into steam, which, like the existing steam, may be energized or even ionized by the laser beam, thus resulting in several of the luminous phenomena observed during the cutting process.

In dealing with the above phenomena, the reactivity of the gas must also be taken into account. In the case of oxygen, if the temperature of the liquid species exceeds a given threshold value (720° C.), an intensely exothermic reaction is initiated, which further accentuates the intensity and instability of the above phenomena, and is what accounts for the more or less periodic oscillation of the various components of the fluid-thermodynamic field. Another important point to note is that the liquid phase subjected to the laser beam may be induced to oscillate at an entirely different amplitude and frequency as compared with those deposited and/or formed on the cutting face. The liquid phases immersed in the gas stream may alter in limited regions the frequency and amplitude of both the free-flow stream at the start of the cut, and that channelled between the cutting faces. The dynamic action of the various phases so interact as to affect the end result of the process in ways and to an extent varying widely depending on the operating parameters and equipment employed.

For example, on commonly used laser cutting equipment, the laser beam is normally focused in a conical nozzle, through which the oxygen is also supplied, with no separation between it and the laser beam, and directed freely on to the cutting area. Moreover, using a conical nozzle located a given distance from the work surface, the oxygen jet forms a round impact spot about the cut, the diameter of which may be as much as 5 to 10 times the width of the cut, which attempts are made to make as narrow as possible.

The above known method presents numerous drawbacks.

Firstly, oxygen consumption is high, due to a substantial percentage being directed to no purpose on to the area surrounding the cut. In the above example, for instance, in which the diameter of the impact spot is 5 to 10 times the width of the cut, consumption is respectively 8 to 30 times that actually required. Secondly, by virtue of contacting a large portion of the laser beam for a considerable length of time, the oxygen is heated to an extremely high temperature by the time it reaches the workpiece.

The effects of such heating are numerous. Firstly, the coefficient of refraction varies irregularly, thus impairing focusing of the laser beam, which is further affected by the convective motion produced by heating the oxygen.

If the gas is heated long enough for it to reach, firstly, the thermal excitation and then the thermal ionization threshold, this may (even at laser cutting power levels) result in dissipation absorbing the power of the laser beam.

The reduction in power and defocusing of the beam combine to reduce the power and increase the diameter of the focal spot, both of which are unfavourable for obtaining as narrow a cut as possible. Moreover, the instability caused by both convective motion and the flow phenomena required for the gas jet to penetrate inside the cut results in unsteady phenomena which also affect cutting efficiency and the quality of the cutting faces: scoring, tears, undesired metallurgical properties.

Most of these drawbacks are caused by using a nozzle which directs the gas jet freely on to the cutting groove surface.

Attempts to increase flow velocity and so improve flushout of the liquid by increasing the pressure of the jet are pointless and even counterproductive in the case of commonly used conical nozzles. When the pressure of the jet is increased over and above the critical ratio, in fact, this results in instability in the direction and velocity of the jet (wobble and pulsation), which further affect the alteration in flow caused by internal and external aerodynamic factors (boundary layers, atmospheric air mix and drag), thus resulting in substantially uncontrollable situations.

The instability of a freely-directed jet makes it even more difficult for the jet to enter and penetrate inside the cut, thus aggravating the "choking" phenomenon typical of subsonic and supersonic jets. In the conduit portion downstream from the choking section, velocity is significantly reduced. Traditional cutting faces therefore present a longitudinal line (i.e. parallel to the top and bottom surfaces of the workpiece) caused by the choking effect, and, up- and downstream from this, a series of differently sloping score lines indicating a change in flow velocity. In particular, the slope of the score lines is greater downstream from the choking line, thus indicating a reduction in flow velocity.

A significant reduction in flow velocity also results in a variation in scoring frequency, as well as in erosion accompanied by droplets of liquified material, all of which are caused by the uncontrolled exothermic reaction produced by greater penetration of the face by the isotherm (about 720° C.) initiating the reaction.

DISCLOSURE OF INVENTION

It is an object of the present invention to provide a straightforward, reliable method of supplying laser cutting gas, designed to overcome the above drawbacks typically associated with known methods.

According to the present invention, there is provided a method of supplying laser cutting gas, whereby the laser beam is directed on to a cutting portion of the workpiece, and characterised by the fact that it comprises a phase wherein a jet of gas is guided by solid walls on to a surface of said workpiece at least close to said portion, and at such a velocity as to control the fluid-thermodynamic effects caused by interaction with said laser beam and with the material liquified by the same, and to flush said liquified material out of the cut in steady, controlled manner.

According to the present invention, there is also provided a laser cutting apparatus comprising a head for focusing the laser beam on to a cutting portion of the workpiece; and means for supplying a jet of gas at least close to said cutting portion; characterised by the fact that said supply means comprise a solid-walled conduit extending into contact with a surface of said workpiece; said conduit being designed to supply said jet at such a velocity as to control the fluid-thermodynamic effects caused by interaction with said laser beam and with the material liquefied by the same, and to flush said liquified material out of the cut in steady, controlled manner.

BRIEF DESCRIPTION OF DRAWINGS

Two preferred, non-limiting embodiments of the present invention will be described by way of example with reference to the accompanying drawings, in which.

BEST MODE FOR CARRYING OUT THE INVENTION

Figure 1:
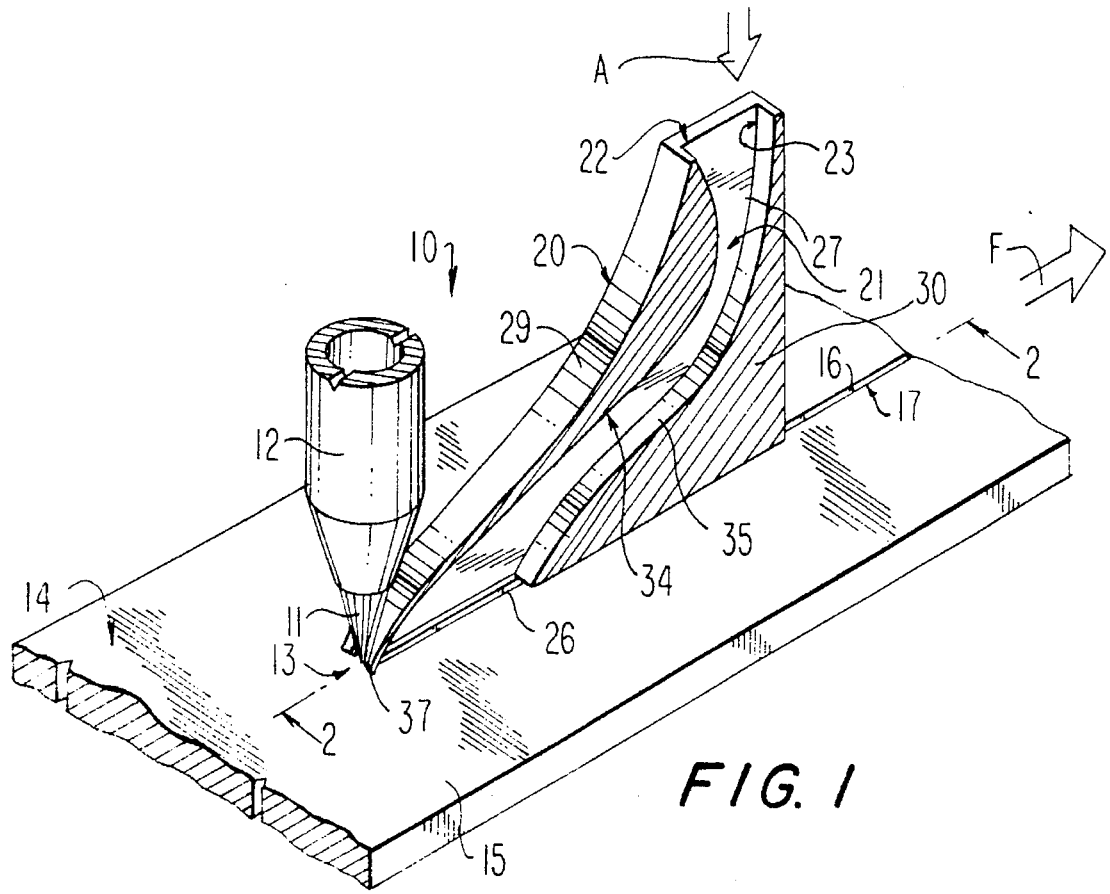
FIG. 1 shows a schematic view in perspective, with parts removed for simplicity, of a first embodiment of a laser cutting apparatus in accordance with the present invention.

Number 10 in FIG. 1 indicates a cutting apparatus featuring a laser beam 11.

Apparatus 10 substantially comprises a laser beam source (not shown), and a focusing head 12, for focusing beam 11 on to a cutting portion 13 of the surface 14 of a workpiece 15, e.g. a metal plate of ferrous material. Apparatus 10 provides for making a very narrow, straight cut 16, with two facing surfaces 17 on the two halves of workpiece 15.

Figure 2:
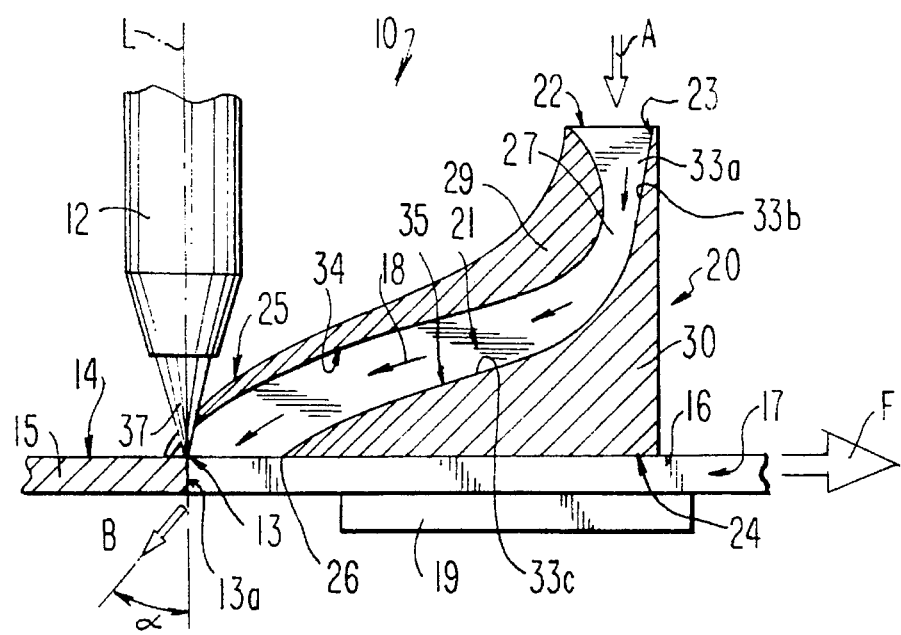
FIG. 2 shows a partial longitudinal section along line II—II of the FIG. 1 apparatus.

According to the present invention, a jet 18 of gas, e.g. oxygen, is guided on to portion 13 of workpiece 15 in such a manner as to prevent it from interacting with the atmospheric air before reaching portion 13. As shown in FIG. 2, jet 18 is supplied on to portion 13 in an inclined direction in relation to laser beam 11. In particular, jet 18 is supplied at high, preferably supersonic, velocity, in such a manner as to enable control of the jet and the fluid-thermodynamic action of the same, and so provide, via exothermic reaction of the jet with the ferrous material, for improved fusion of the material by the laser beam, and rapid, steady, homogeneous flushout of the liquefied material.

Cutting apparatus 10 comprises conveying means, shown schematically by 19 in FIG. 2, for moving workpiece 15 in relation to head 12 along the cutting line and in the direction of arrow F.

Apparatus 10 also comprises an oxygen supply circuit (not shown) to which is connected a supply device 20. Supply device 20 presents a solid-walled inner conduit 21 curving in such a manner as to direct jet 18 from direction A, substantially parallel to axis L of laser beam 11, to direction B lying in the plane defined by direction A and axis L, but inclined in relation to axis L by a given angle α. Angle α is such that jet 18 presents a transverse component in relation to axis L oriented in the opposite direction to the traveling direction F of workpiece 15, so that jet 18 flows over surfaces 17 of cut 16 through the entire thickness of workpiece 15.

Flushout is assisted by the angle of jet 18, which increases impact pressure and, consequently, penetration and removal of the liquid layer.

Supply device 20, which is substantially shaped like a shoe, presents a top base 22 in which the inlet 23 of conduit 21 is formed; and a bottom base 24 in which the outlet 26 of conduit 21 is formed close to the tapered front end portion 25 of device 20.

Device 20 is defined laterally by two closely fitted flat parallel walls 27 (only one of which is shown in FIG. 1), the inner surfaces of which laterally define conduit 21, which is thus narrow and substantially equal to the width of cut 16. The length of outlet 26 is roughly 3 to 6 times said width.

Device 20 is defined at the front by a first shaped wall 29, and at the bottom and rear by a second shaped wall 30. Together with lateral walls 27, wall 30 defines bottom base 24, which is flat and slides over surface 14 of workpiece 15 in airtight manner via mechanical or fluid-dynamic means preventing gas in the atmosphere from mixing with the cutting gas. This may be achieved, for example, using a labyrinth seal or, in the case of straightforward but accurate mechanical slide, a cutting gas pressure higher than that of the atmospheric gas.

In addition to lateral walls 27, conduit 21 is thus also defined by respective inner surfaces 34 and 35 of walls 29 and 30. As described later on, surfaces 34 and 35 are curved and so shaped as to define the aerodynamic characteristics of conduit 21. In particular, the generating lines of surfaces 34 and 35 are perpendicular to lateral walls 27, so that conduit 21 presents a rectangular cross section of constant width and varying in area.

Conduit 21 is curved so as to direct jet 18 from direction A at inlet 24 to direction B at outlet 26.

Conduit 21 constitutes a convergent-divergent nozzle for attaining a supersonic velocity of jet 18, and consists of a convergent portion 33a between inlet 23 and a contracting section (throat) 33b defined by a shaped portion 36 of curved upper surface 34; and a divergent portion 33c between throat 33b and outlet 26.

At the end of tapered portion 25, front wall 29 of supply device 20 presents an opening 37 perpendicular to outlet 26 and coaxial with beam 11, which is thus only allowed through jet 18 in the end portion of conduit 21. Beam 11 penetrates workpiece 15 at impact surface 13, and gradually works down to surface 13a (FIG. 2) where the cut is originated and extended.

As the workpiece is cut, jet 18 only flows over a very narrow strip of original surface 14, substantially equal to the width of the cut, and penetrates between surfaces 17 over the entire thickness of workpiece 15. Closed conduit 21 guides jet 18 in controlled manner up to surfaces 13 and 13a, thus preventing it from mixing with the air, and through the point at which beam 11 interacts with surfaces 13 and 13a, so as to exploit the exothermic reaction of the jet for improving liquefaction of the material, and the fluid-mechanical action of the jet for flushing the liquid material out of cut 16.

Figure 3:
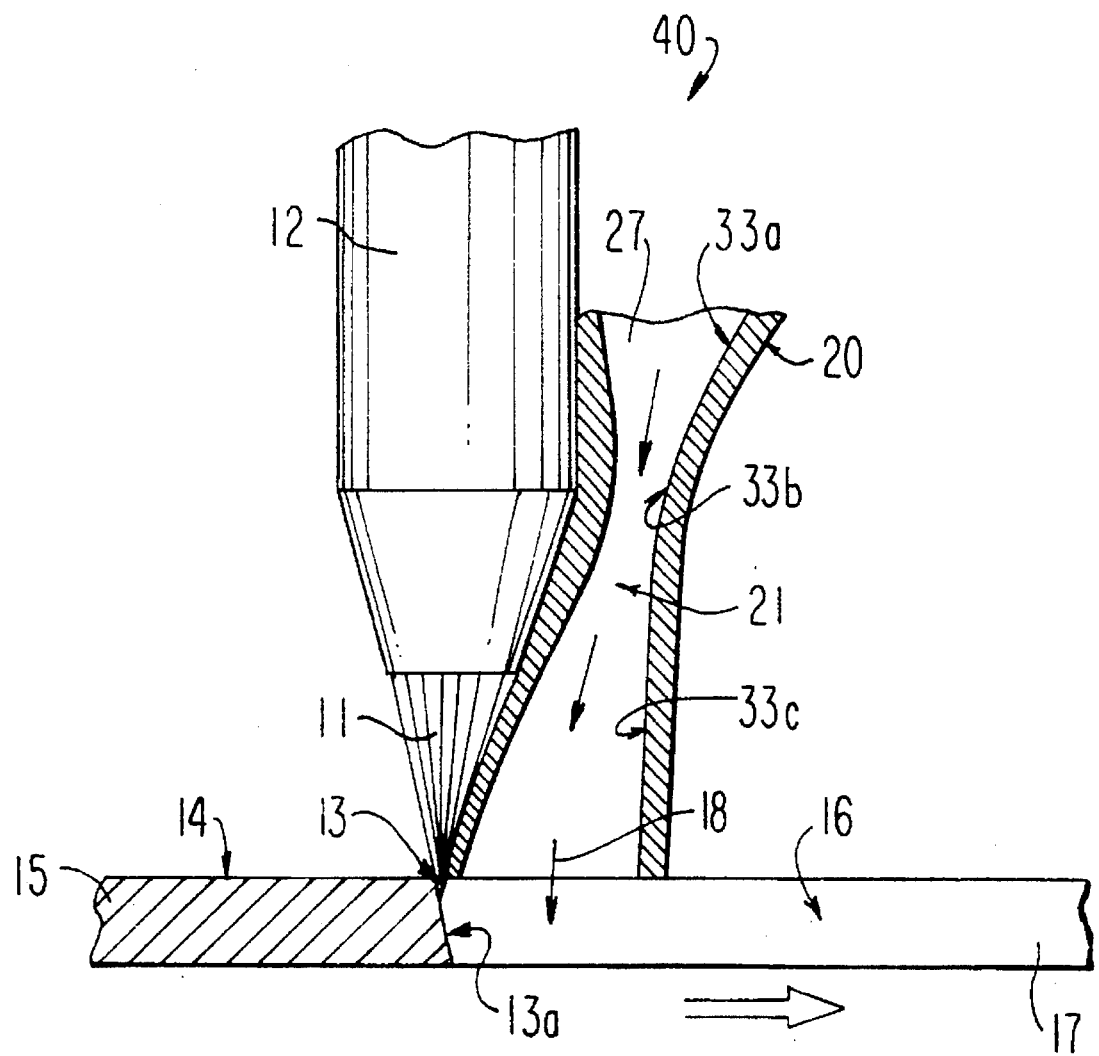
FIG. 3 shows a schematic, partial longitudinal section of a second embodiment of the cutting apparatus according to the present invention.

FIG. 3 shows a cutting apparatus 40 according to a further embodiment of the present invention, and the following description of which is limited solely to the differences as compared with apparatus 10 in FIGS. 1 and 2. Any parts similar to those of apparatus 10 are shown using the same numbering system.

Apparatus 40 presents a more compact supply device 20 located next to focusing head 12 and having a conduit 21. In this case, laser beam 11 is located entirely outside conduit 21.

Conduit 21 provides for directing jet 18, substantially parallel to beam 11, on to a cutting portion 16 adjacent to surface 13a in which the actual cut is originated. In this case also, conduit 21 is a convergent-divergent type for attaining a supersonic velocity of jet 18, and is defined by closely fitted flat parallel lateral walls 27 for limiting the width of jet 18 to substantially the same width as cut 16.

Apparatus 40 operates in the same way as apparatus 10, and therefore requires no further description.

The advantages of the method and apparatus according to the present invention will be clear from the foregoing description. Firstly, the design of conduit 21 provides for significant saving by only supplying the amount of oxygen strictly required for the cutting process.

Secondly, the high velocity of jet 18 provides for rapid flushout of the liquified material, and for controlling the fluid dynamics of the same, so as to substantially eliminate any alteration of the cutting faces, in particular, the longitudinal choking line and scoring up- and downstream from the same typically associated with known methods.

Thirdly, the solid wall of conduit 21 prevents the gas from mixing with atmospheric air, and all the drawbacks this entails.

Finally, fluid-thermodynamic control of the jet ensures steady, controlled sweep of the oxygen over the entire thickness of the material, thus enabling steady control of the various phenomena involved in the process, and a substantially perfect finish of the cutting faces.

To those skilled in the art it will be clear that changes may be made to the embodiments described and illustrated herein without, however, departing from the scope of the present invention.

For example, changes may be made to the section or design of conduit 21, or to the way in which atmospheric air is prevented from mixing with the cutting gas where supply device 20 contacts or slides over surface 14 of workpiece 15.

I claim:

1. A method for supplying cutting gas conjointly with a laser beam for executing cuts in a workpiece comprising the steps of:

passing said laser beam through a focusing head for focusing the longitudinal axis of the laser beam to intersect a selected spot on the surface of the workpiece;

moving the workpiece relative to the focused laser beam for forming a cut in said workpiece with the cut progressing opposite to the direction of travel of said workpiece relative to said laser beam;

feeding said cutting gas through a conduit physically separated from said focusing head so that said cutting gas interacts with the laser beam at said focused spot;

said conduit comprising a plurality of solid uninterrupted walls including at least two flat wall surfaces, with said flat wall surfaces aligned in the direction formed by said cut in the workpiece and with said wall surfaces forming an internal channel having a substantially rectangular cross section in a plane parallel to the plane of said workpiece containing said spot;

maintaining said internal channel aligned in the direction formed by said cut; and maintaining said conduit in close contact with the surface of the workpiece and adjacent to said cut whereby said cutting gas flows at a velocity uniform in space and time, so at to control the thermo-fluid-dynamics of the interaction of said cutting gas and said laser beam to readily flush out liquified material from the workpiece as it is being cut.

2. A method as defined in claim 1 wherein said flat wall surfaces are separated a fixed distance apart substantially equal to or less than the width of the cut formed in said workpiece.

3. A method as defined in claim 2, wherein the velocity of said cutting gas is supersonic.

4. A method as in claim 3, wherein said cutting gas is directed from said conduit at said workpiece so as to form a component having a direction opposite to the moving direction of said workpiece relative to said laser beam.

5. A method as defined in claim 4 further comprising the step of sealing said conduit at the end thereto in contact with said surface of said workpiece for preventing the escape and intermixing of gases.

6. A method as defined in claim 5, wherein said workpiece is composed of an iron based metallic material and wherein said cutting gas is oxygen for exothennically reacting with said material.

7. A method as in claim 5, wherein said cutting gas is directed from said conduit to intersect said workpiece adjacent to the intersection of said laser beam with said workpiece.

8. A method as defined in claim 7, wherein at least one of said solid uninterrupted walls is aerodynamically shaped such that said conduit constitutes a nozzle having a longitudinal symmetry plane coinciding with said cut.

9. A method as defined in claim 8, wherein said flat wall surfaces extend lengthwise at distance of at least 3 to 6 times its lateral separation.

10. A method as defined in claim 9, wherein said laser beam is focused in a direction orthogonal to said workpiece surface being cut.

11. A method as defined in claim 10, wherein said cutting gas is directed substantially parallel to the direction of said laser beam.

12. Laser cutting apparatus comprising a laser beam, a head for focusing the laser beam at the surface of a workpiece for executing cuts in the workpiece when the workpiece is moved relative to the laser beam and supply means physically separated from said focusing head but stationary with respect to it for directing a jet of gas at the workpiece so that the jet of gas interacts with the laser beam at the intersection of the laser beam and the workpiece, wherein said supply means comprises a solid walled conduit having flat inner wall surfaces and at least one inner aerodynamically contoured inner wall surface and an end portion which terminates to form a two dimensional nozzle having a rectangular opening adapted to sustantially match the opening of the cut as it is being formed in the workpiece, said nozzle adapted to be held in relatively close contact with said workpiece immediately adjacent the opening of the cut being formed;

whereby the nozzle establishes a velocity for said jet substantially uniform in space and time for controlling the fluid-dynamics of said interaction of the gas jet with said laser beam and workpiece, while giving to the jet sufficiently high pressure and velocity for readily flushing out liquified material from the cut in said workpiece.

13. Laser cutting apparatus as defined in claim 12, further comprising sealed means located between said conduit and said surface of said workpiece, for preventing the escape and intermixing of gases.

14. Laser cutting apparatus as defined in claim 12, wherein said aerodynamic shaped wall surfaces define a substantially rectangular geometry convergent-divergent nozzle for said gas enabling said gas to attain a supersonic velocity with a rectangular exit cross section.

15. Laser cutting apparatus as in claim 14, wherein said laterally separation of said flat wall surfaces is substantially equal to or less than the width of the cut formed by said laser beam in said workpiece.

16. Laser cutting apparatus as in claim 15, wherein said flat wall surfaces extend lengthwise a distance of at least 3 to 6 times its lateral separation.

17. Laser cutting apparatus as defined in claim 14, wherein said gas is oxygen.

\* \* \* \* \*